Oct. 27, 1964  J. H. KAIL  3,154,625
PHOTOMETRIC METHOD FOR GRADING BEEF
Filed Jan. 3, 1961  2 Sheets-Sheet 1
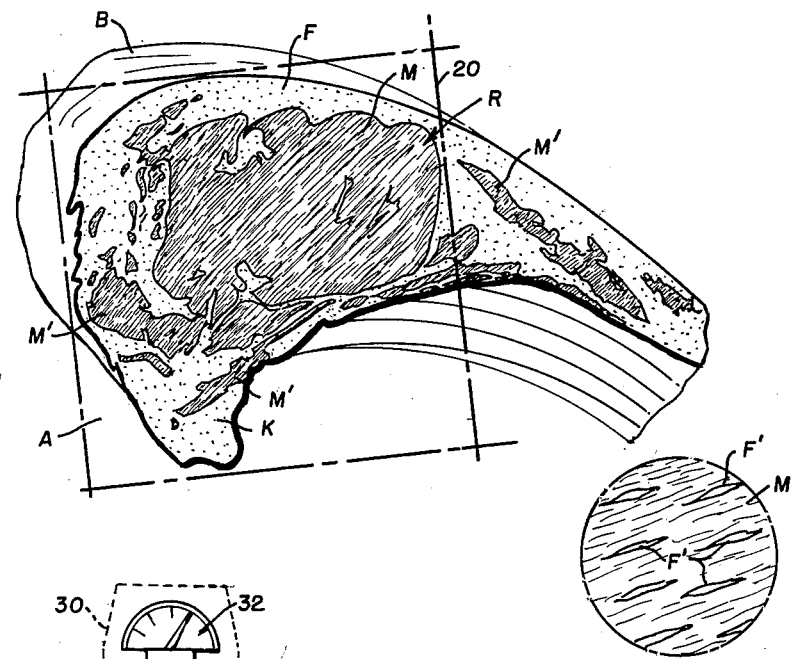
Fig. 1
Fig. 2
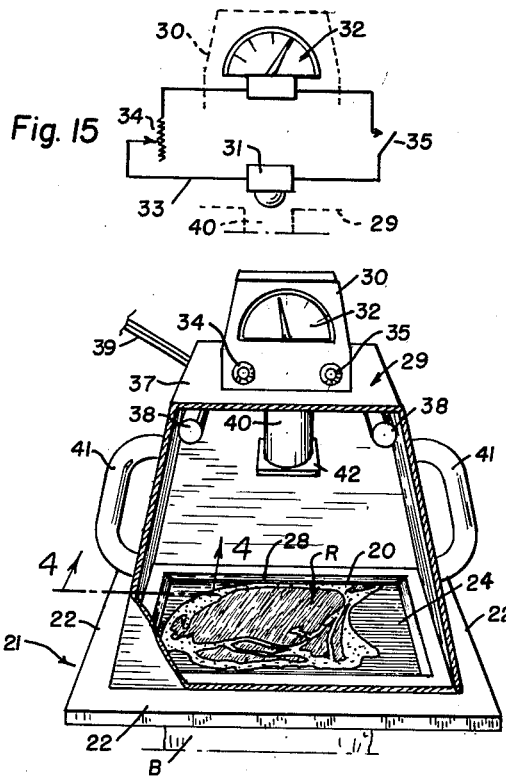
Fig. 15
Fig. 3
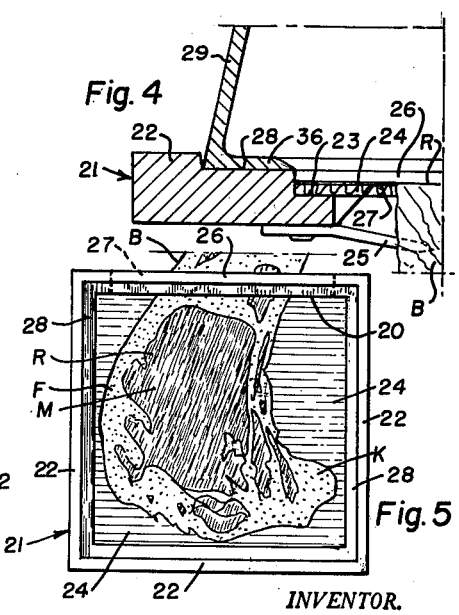
Fig. 4
Fig. 5
INVENTOR.
James H. Kail
BY WHITEHEAD, VOGL & LOWE
PER Frank C. Lowe
ATTORNEYS Oct. 27, 1964  J. H. KAIL  3,154,625
PHOTOMETRIC METHOD FOR GRADING BEEF
Filed Jan. 3, 1961  2 Sheets-Sheet 2

INVENTOR.
James H. Kail.
BY WHITEHEAD, VOGL & LOWE
PER
ATTORNEYS

United States Patent Office 3,154,625
Patented Oct. 27, 1964

3,154,625
PHOTOMETRIC METHOD FOR GRADING BEEF
James H. Kail, 729 E. 16th St., Denver, Colo.
Filed Jan. 3, 1961, Ser. No. 80,440
4 Claims. (Cl. 88—14)

This invention relates to the grading of beef according to improved standards to designate both quality and yield of the meat in a beef carcass, and more particularly to a method for measurement of the physical characteristics of a beef carcass to facilitate grading it.

In the present long-used method of grading beef the carcass is given a single designation or grade such as prime, choice, good, standard, utility, cutter or canner. In assigning a beef carcass to its selected grade there is no real indication that both the quality and yield factors are variable. A carcass of choice quality but having an inferior yield of meat is often graded as good to account for such factors in a rough fashion.

While the limitations of such a method of grading beef are well known, the method has, nevertheless, been used throughout the country for many years. It is only recently that steps have been taken by the United States Department of Agriculture to introduce new grading standards which are more realistic. Actually, the department, and others, are proposing a dual system of grading with one grade indication being used to designate the yield of the lean meat in the carcass and another grade indication being used to designate the quality of the meat. The importance of such a designation is amply demonstrated where two steers of the same weight on the hoof and having carcasses which appear very similar will nevertheless have substantially different meat yields when excess fat is cut away. In actual tests, one carcass will have as much as ten percent more useable meat and will bring to the retailer as much as $50.00 in additional meat cuts over the other carcass. The importance of this condition is appreciated by the industry, and there has been considerable study in an effort to determine how to appraise a beef carcass to more accurately estimate its meat yield at the packing house and before it is shipped to the retailer or ultimate consumer.

As in any similar endeavor where appraisal of values is concerned, the meat appraiser or grader seeks a simple index which may not be strictly accurate but which will quickly permit a good determination of the many complex factors which go into the structure of a beef carcass. In seeking such an index, it has been found that the closest approach lies in the characteristics of the beef carcass at the rib eye, the cut across the carcass between the twelfth and thirteenth ribs. At this point the amount of meat and fat is related, comparatively, to the total amounts of meat and fat on the carcass. It follows that the rib eye can be used as an indicia of fat thickness about the carcass and the amount of fat in the kidney and pelvic regions and of the amount of lean meat on the carcass.

Several methods have been proposed for the determination of the ratio of fat to lean meat by study of the rib eye and such methods vary from visual appraisal of the cut to elaborate measuring apparatus. However, an individual's personal judgment—eyeballing the carcass—is not accurate and precise measurements of the meat and fat areas as with screengrid counts are generally too tedious to be satisfactory. In addition to being time consuming they give no indication whatsoever of the actual meat quality.

There is a real and definite need for improved methods and apparatus for quantitatively and qualitatively appraising the meat of a beef carcass. Based upon the possibility of using the rib eye cut as the indicator, the present invention was conceived and developed. It comprises in essence, the use of a photometer in an improved apparatus which produces a quantitative measurement of the respective areas of fat and meat at the rib eye and also similar quantitative measurements of fat flocks within the meat itself which are found to be an indicia of the quality of the meat. A grader using the improved apparatus and method can correlate the information he obtains with the weight of the animal and by use of selected charts he can then quickly evaluate proper grades to designate both the meat yield and quality of any given beef carcass.

It follows that a primary object of the invention is to provide a novel and improved method for evaluating a beef carcass both as to yield and as to quality.

Another object of the invention is to provide a novel and improved method of evaluating a beef carcass by instrumental measurements which are quick, simple, accurate and which effectively eliminates the human errors of judgment.

A further object of the invention is to provide a novel and improved method of evaluating the beef carcass for both yield and quality which may be performed by an average individual with a minimum of instruction, and without requiring special skill and training on his part.

Yet other objects of the invention are to provide a novel and improved method for observing and measuring the characteristics of the rib eye portion of a beef carcass as an indicia to evaluate the yield and quality of meat of the carcass, which is simple, reliable, compact, easy to use and which may be used in conjunction with, and to supplement, the recent findings of the Department of Agriculture in the methods of grading beef.

With the foregoing and other objects in view, all of which more fully hereinafter appear, my invention comprises certain novel and improved steps, sequences and operations, and constructions, combinations and arrangements of parts and elements as hereinafter described, defined in the appended claims and illustrated in the accompanying drawing in which:

FIGURE 1 is a plan view of the rib eye portion of a beef carcass with broken lines indicating a desirable area of observation of the rib eye portion for evaluation of the meat yield and quality of the carcass.

FIGURE 2 is a circular fragmentary plan view of a portion of the meat surface itself, on a greatly enlarged scale, and illustrating flocks of fat which appear within the meat and which are indicative of the quality of the meat.

FIGURE 3 is a perspective view of an apparatus used in evaluating the rib eye portion of the meat in accordance with the principles of the invention, with the rib eye portion being properly positioned within the apparatus and with wall portions of the apparatus being broken away to show elements otherwise hidden from view.

FIGURE 4 is fragmentary sectional detail as taken from the indicated line 4—4 at FIG. 3 but on a greatly enlarged scale.

FIGURE 5 is a plan view of the base portion of the apparatus, with the beef rib eye being positioned therein, as in the view illustrated at FIG. 3.

FIGURE 15 is a diagrammatic representation of a circuit suitable for use in the apparatus.

Figure 6:
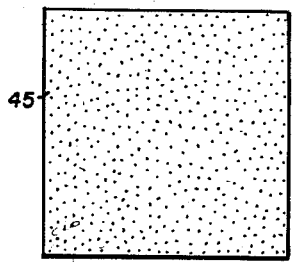
FIGURE 6 is a plan view of a first calibrating plate used in connection with the apparatus illustrated at FIGS. 3 and 5.

Referring more particularly to FIG. 1 of the drawing, the rib-eye cut of a beef carcass B lies between the twelfth and thirteenth rib. It is formed by cutting the carcass between the ribs substantially transversely to the backbone of the animal. In this rib eye there is a centralized area of meat or rib eye muscle M surrounded by layers of fat including the outside fat F. Also, within these fat areas there exist other smaller area of muscle or meat M' which supplement the rib eye muscle M.

Proposed methods of grading the beef would be to measure the thickness of the layer of outside fat F, the thickness or amount of kidney fat K and the area of the rib eye muscle. However, in the present invention, a new system of using only area measurements is set forth. The improved method is to determine directly the actual surface area of the rib eye cut R, and the area of fat therein including the outside fat F and the kidney fat K, and the areas of meat including the rib eye muscle M and other muscles M'.

In establishing any comparative system, only a selected portion of the rib eye cut must be set out and used, and as illustrated at FIG. 1, such a portion may be defined as lying within a designated enclosure area A, in the broken line rectangle at FIG. 1. This rectangle is sufficiently large to include the entire rib eye R with one line forming a dividing line 20 to separate the rib eye portion of the cut from the ribs to the side thereof. The location of the line 20 is quite arbitrary but once a criterion of location is established it must be consistently used for good results. As illustrated at FIG. 1, one manner of orienting or establishing this dividing line 20 is to place it where it is substantially transverse to the rib alignment and where it almost, but not quite, touches the rib eye muscle M, say for example, that the line 20 shall be one-eighth inch from the edge of the rib eye muscle M.

The improved method uses a photometer means which views the rib eye cut R when the cut is placed within a rectangular base frame 21 and the photometer, hereinafter described, is placed upon the frame. This frame 21 is similar in form to an ordinary picture frame having an inner opening corresponding with the enclosure area A. Three sides 22 of this frame represent the portion of the enclosure area which does not touch the rib eye cut and these sides are of sufficient thickness to form an inner shelf 23 which is normally below the surface of rib eye cut R of the beef carcass B. This shelf supports closure material 24 which may be of corrugated paper, cloth or the like and which closes the spaces between the sides 22 and edge of the beef carcass B below the rib eye cut. This material is opaque and of a light absorbing color such as black for purposes hereinafter explained.

The fourth side 26 has an upraised under-portion 27 which permits it to set directly upon the surface of the rib eye cut R and the inner edge of this side 26 forms the arbitrary dividing line 20 to position the rib eye cut within the frame for proper measurement and area determination. To complete the base frame the side 22 may also include suitable inwardly directed prongs 25 or the like to facilitate holding the base frame 21 upon the beef carcass B, and a second shelf 28 extends about the sides 22 and 26 to receive a hood 29 which carries a photometer 30.

The photometer 30 may be any suitable light-sensitive instrument which will cause a recording instrument to record light intensity in a linear manner and thereby permit a comparative determination of light intensity as a ratio or percentage. For example, a cadimum-selenium cell 31 may be connected with a galvanometer 32 as in a circuit 33. This circuit 33 is illustrated in a simple form at FIG. 15 and includes only a rheostat 34 and a cut-off switch 35. Other amplifying means, not shown, may be included in this circuit if desired, but such is not essential since many light sensitive cells have sufficient output to adequately deflect a sensitive galvanometer. The rheostat 34, or its equivalent, however, is desirable for setting the galvanometer to a 100 percent reading for any given light intensity.

The hood 29 may be formed as frusto-pyramid having a rectangular base with an inturned base edge 36 formed to set within the shelf 28 to provide for a light-tight fit. The photometer 30 is supported upon the top 37 of this hood. A suitable means is also incorporated within the hood to project light to the surface of the base frame 21, such for example, as the lights 38 which are positioned within the hood adjacent to the top 37. A battery or any suitable current source such as from an electric cord 39 may be used to light these lights.

It is essential, however, that none of the light from the lights 38 is picked up by the cell 31 except that which is reflected from surfaces within the base frame 21. To avoid the possibility of undesirable stray light, a view-tube 40 projects downwardly through the top 37 of the hood to a point below the lights 38, and the light-sensitive cell 31 is immediately above this view-tube. Also, to prevent reflection from the walls and the base edge 36 of the hood, they are black or of any other light-absorptive color.

To complete the photometer unit, suitable handles 41 or other gripping means may be provided on the sides of the hood and a suitable light filter 42 covers the base of the view-tube 40. The filter is adapted to pass white or cream-colored light such as would be reflected from the fat surfaces of a meat cut but to absorb red colored which would be reflected from the muscle portions of the rib eye cut. The apparatus, however, also includes an array of calibrating plates such as illustrated at FIGS. 6 through 9. These plates will now be described in connection with a description of the operation of the apparatus according to my improved method.

To prepare for an area measurement of the rib eye to alternately determine the quality and yield of a beef, the rib eye portion R is set within the base frame 21 with the side 26 being positioned at the dividing line 20 and spaces between the sides 22 and side of the beef carcass are closed by the non-reflective material 24.

Figure 10:
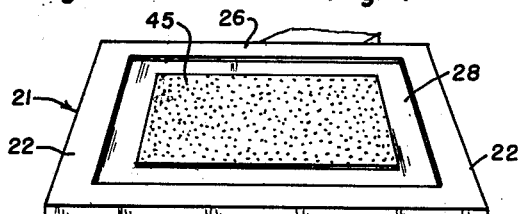
FIGURE 10 is a perspective view of the base portion of the apparatus as illustrated at FIG. 5 but with the first calibrating plate, illustrated at FIG. 6 being positioned thereon as in the first step of the measuring operation.

However, the first step after the set-up is completed is to calibrate the photometer 30. This is accomplished by using the rectangular gage plate 45 illustrated at FIG. 6. This plate 45 is sized to fit within the opening of the base frame 21 and is colored to match the color of natural fat to correspond with the fat surface of the beef carcass. When the photometer unit is set upon the base frame 21 with the plate 45 being in the position illustrated at FIG. 10, a direct measurement of light reflection from this plate is obtained. The needle of the galvanometer 32 will deflect and the rheostat 34 will then be adjusted to a base reading such as a 100 percent indication. This reading is directly proportional to the area of the cover plate 45.

Figure 7:
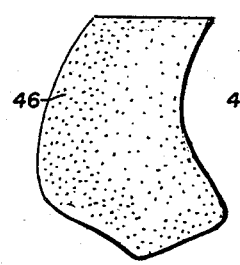
FIGURE 7 is a plan view of a second calibrating device used in connection with the invention.
Figure 11:
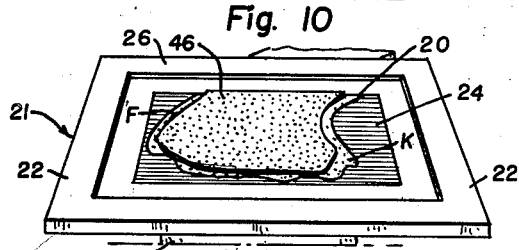
FIGURE 11 is a perspective view similar to FIG. 10, but with the second calibrating plate thereon as in the second step of the measuring operation and before the rib eye itself is observed as at FIG. 3.

A second gaging plate 46 is illustrated at FIG. 7. This plate is also fat colored and it is formed to cover the rib eye muscle M and the other muscle portions M' of the rib eye cut R. The plate is placed over these muscles as illustrated at FIG. 11. Placing the photometer unit upon the base frame 21 will permit a light reflection from the fat F of the rib eye cut R and from the fat colored cover plate 46. However, the areas covered by the closure material 24 between the sides 22 and the edge of the beef carcass B will not register any reflective indications upon the photometer and the galvanometer needle will deflect less than the base reading or 100 percent deflection. When a photometer which operates in a linear manner is used, it is but a simple matter to determine the entire area of the rib eye cut R since that area will be proportional to the area of the gage plate 45 as the galvanometer reading will be proportional to the former base or 100 percent reading.

The next step in the method is to remove the plate 46 and to permit the photometer unit to observe the rib eye cut directed as illustrated at FIG. 3. This will produce a deflection of the galvanometer which is even less and reading then is an indication of the area of fat in the rib eye compared with the area of the plate 45. It follows that these three simple settings and readings of the apparatus and a few quick computations will give the area of the rib eye cut R, the area of the meat portions M and M' and the area of the fat portions F and K with a high degree of accuracy.

Moreover, the photometer will see not only the outside fat F and the kidney fat K, but it will also see the amount of fat within the meat itself. A high quality meat has a number of small flocks F' of fat within the meat fibers which are shown diagrammatical as at FIG. 2 on an enlarged scale. It has been determined that the quality of meat is directly related to the area of fat flocks within the meat itself, and although these flocks F' do not significantly affect the total fat area of the rib eye cut. This factor permits the apparatus to be used, as a continuation of the operations, to determine not only the yield but also the quality of the beef within the carcass.

Figure 8:
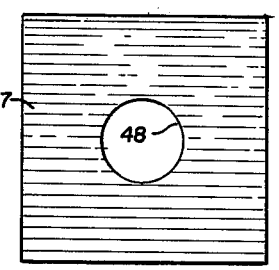
FIGURE 8 is a plan view of a third calibrating device.
Figure 9:
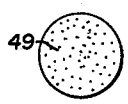
FIGURE 9 is a plan view of a fourth calibrating device used in connection with the invention.
Figure 13:
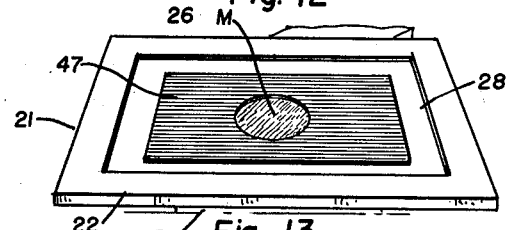
FIGURE 13 is similar to FIG. 12 but with the fourth calibrating device, shown at FIG. 9, being removed as a second step to determine the quality of the meat.
Figure 14:
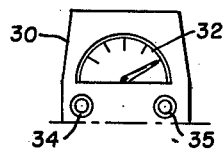
FIGURE 14 is a series of diagrammatic views of a galvanometer-like gage of the type illustrated at FIG. 3, and with each of the gages showing comparative needle movements which occur when the apparatus is operated according to the invention.
Figure 14:
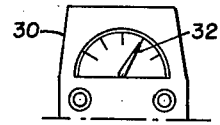
Figure 14:
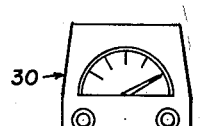
Figure 14:
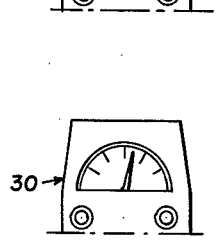

A dark-colored, light-absorbing, cover plate 47, FIG. 8, is formed of a size similar to the cover plate 45 of FIG. 6 to cover the entire opening of the base frame 21. It includes a central orifice 48 which is positioned to lie near the middle of the rib eye muscle M so that when placed over the rib eye cut only the muscle portion M will show through the orifice, as illustrated at FIG. 13. A fat colored disc 49 is sized to lie within the orifice 48 to be used in connection with this plate.

To initiate a measurement of the quality of meat, the plate 47 is set within the opening of the frame 21 and the disc set within the orifice. The photometer is then set upon the base 21, as in the manner hereinbefore described, and the needle of the galvanometer 32 is adjusted to a base or a 100 percent position by the rheostat 34.

The next step is to remove the disc 49 and view the meat cut directly. The needle will then drop to a much lower reading and will indicate correctly the percentage of fat within the selected area.

With the information obtained by the measurements described herein, the meat grader will know, in addition to the weight of the beef carcass, the area of the rib eye, area of fat at the rib eye, the area of meat at the rib eye and the percent area of fat flocks within the meat. Since this information is indicative of the yield of the beef and of the quality of the meat, the grader using this apparatus merely has to resort to comparative tables to properly and accurately grade the carcass and to make such determination in a very quick period of time.

Figure 12:
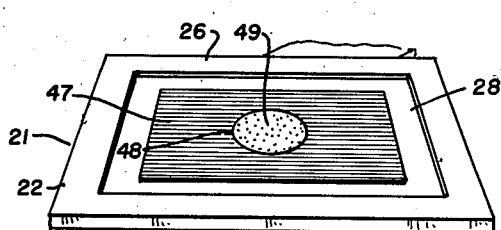
FIGURE 12 is a perspective view similar to FIG. 10 but with the third and fourth calibrating plates, illustrated at FIGS. 8 and 9, being positioned thereon as a first step to determine the quality of the meat itself.

It is to be noted that certain steps, once established may be omitted where a large number of beef carcasses are being graded. For example, the determination of the 100 percent setting using the cover plate 45 need not be repeated every time a beef carcass is being graded. Also, where considerable grading is being done, it is desirable to have two photometers. One to make the determination of the areas as in the method described and illustrated at FIGS. 11 and 3, and the other to make determination of quality as described and illustrated at FIGS. 12 and 13. Moreover, it is immediately apparent that others skilled in the art can devise and arrange alternate and equivalent steps and operations and equivalent devices and apparatus all of which are clearly within the spirit and scope of my invention. Hence, I desire that my invention be limited not by the specific details of operations, steps, apparatus and devices herein illustrated and described, but only by the proper scope of the appended claims.

I claim:

1. A method of grading meat by comparing the fat area and meat area at the rib eye cut or like cut of a carcass, by observation of light reflected from the cut and into a photometer which is adapted to register light reflected from fat but not to register light reflected from muscle, including the steps of selecting a characteristic section of the rib eye cut, covering the muscle portions of the cut with a fat colored plate, reflecting light from the covered cut and into the photometer to obtain a reading of the reflected light intensity and removing the cover from the meat portion thereof, whereby to obtain a modified reading on the photometer and to thereby ascertain the proportional area of fat about the rib eye muscle to the area of the section.

2. In the method set forth in claim 1, the further step of reflecting the light from a fat colored plate having a selected area to obtain a reading of reflected light intensity by the photometer which is related to the area of the plate, whereby to ascertain the actual area of the section and the actual area of fat within the section and about the rib eye muscle.

3. In the method set for in claim 1, the further step of observing the intensity of light reflected from a fat colored plate covering only a selected portion of the rib eye muscle and removing the plate and observing the light reflected from only the portion of meat covered by said plate, whereby to ascertain the percentage area of fat flocks within the rib eye muscle.

4. A method for determining the quality of a meat muscle by comparing the area of fat flocks within the muscle to the area of the muscle by observation of light reflected from a transverse cut across the muscle by a photometer adapted to register light reflected from fat and not to register light reflected from meat including the step of observing a selected area of the muscle cut covered by a fat colored plate reflecting light from the cut to the photometer to obtain a reading of reflected light intensity and removing the cover from the muscle cut to obtain a modified reading of reflected light by the photometer.

References Cited in the file of this patent

UNITED STATES PATENTS

| | | |
|---|---|---|
| 1,993,958 | Ybarrondo | Mar. 12, 1935 |
| 2,179,000 | Tea | Nov. 7, 1939 |
| 2,261,192 | Townsend | Nov. 4, 1941 |
| 2,591,504 | Botts | Apr. 1, 1952 |
| 3,020,801 | Lander et al. | Feb. 13, 1962 |

OTHER REFERENCES

Smith et al.: Tomato Classification, Electronics, January 1952, pages 92–94, volume 25, No. 1.